United States Patent
Monahan et al.

(10) Patent No.: US 6,628,909 B2
(45) Date of Patent: Sep. 30, 2003

(54) APPARATUS AND METHOD FOR THE INSTALLATION AND ALIGNMENT OF AN ENDLESS BELT

(75) Inventors: Michael B. Monahan, Webster, NY (US); Carlos A. Lopez, Webster, NY (US); Joseph D. Hancock, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/145,663

(22) Filed: May 14, 2002

(65) Prior Publication Data

US 2003/0047424 A1 Mar. 13, 2003

Related U.S. Application Data

(60) Provisional application No. 60/314,889, filed on Aug. 24, 2001.

(51) Int. Cl.$^7$ .......................... G03G 15/00; B65G 39/16
(52) U.S. Cl. ...................... 399/116; 399/162; 399/165; 198/313
(58) Field of Search .................................. 399/116, 162, 399/165, 312, 313, 329; 198/806, 807, 810.03, 813

(56) References Cited

U.S. PATENT DOCUMENTS 6,269,231 B1 * 7/2001 Castelli et al. .............. 399/165
6,363,600 B2 * 4/2002 Pang .......................... 399/165

* cited by examiner

Primary Examiner—Susan S.Y. Lee
Assistant Examiner—Ryan Gleitz

(57) ABSTRACT

A method for aligning an endless belt having an optimum position within an acceptable range on associate guide rollers in a machine by manually placing the belt over an outboard end of the guide rollers and sliding the belt inward over the guide rollers to a first rough position. When it is determined that the belt has reached an acceptable range of positions, the belt is steered inward using a given operational steering angle. When it is determined that the belt has reached an optimum position, the belt is driven at an operational speed and steered inward and outward to maintain the optimum position.

11 Claims, 8 Drawing Sheets

APPARATUS AND METHOD FOR THE INSTALLATION AND ALIGNMENT OF AN ENDLESS BELT

This application is based on a Provisional Patent Application No. 60/314,889, filed Aug. 24, 2001.

FIELD OF THE INVENTION

The present invention pertains to a method of mounting and aligning an endless belt on associated rollers in a machine. More particularly, the present invention relates to a method and device for facilitating installation of an endless belt, such as a photoconductive belt, into an electrostatographic printing machine.

BACKGROUND OF THE INVENTION

A typical electrostatographic printing machine 10 is diagrammatically illustrated by way of example in FIG. 1. Printing machine 10 includes a photoconductive member 10 in form of an endless photoconductive belt 12 having a photoconductive surface 14. The photoconductive belt is mounted on a plurality of guide rollers 16 and backer bars 18. At least one of the rollers 16 is driven for rotating the belt in the direction of arrow 20 through a plurality of generally conventional electrostatographic printing modules. First, a charging module 22 charges the photoconductive surface 14 of the belt 12 to a substantially uniform potential. An exposing module 24 then exposes the charged photoconductive surface to a light image of an original document being reproduced. Exposure of the charged photoconductive surface 14 selectively dissipates the charge in the irradiated areas of the photoconductive surface. As a result, an electrostatic latent image corresponding to the image of the original document is formed on the photoconductive surface 14. After the electrostatic latent image is recorded on the photoconductive surface, a developing module 26 develops a latent toner image on the photoconductive surface by bringing a developer material into contact with the photoconductive surface. In typical bi-component developer systems, the developer material is composed of toner particles adhering triboelectrically to carrier granules. The toner particles are attracted from the carrier granules to the latent image to form a developed toner image on the photoconductive member. The toner image is then transferred from the surface of the photoconductive member 10 to a copy substrate or print sheet 30, such as a sheet of paper, by a transfer module 28. Thereafter, heat or some other known treatment is applied to the toner image on the print sheet by a fuser 32, thereby permanently affixing the toner image to the print sheet. Residual toner is removed from the photoconductive member by a cleaner 34.

In order to generate multi-color prints, there may be a group of process modules 22, 24, 26 through 22-C, 24-C, 26-C for each of a plurality of colors. For example, there may be a group of modules for each of cyan 22, 24, 24, 26, yellow 22-A, 24-A, 26-A, magenta 22-B, 24-B, 26-B and black 22-C, 24-C, 26-C. There may also be one or more additional sets of modules 22-D, 24-D, 26-D for one or more custom colors. One method of generating multicolor prints is to arrange all of the color modules around a single photoreceptor belt 12 as illustrated in FIG. 1. The full color image may be formed by exposing and developing all of the color toner images, one on top of each other, during a single rotation of the photoreceptor belt. The full color toner image may then be transferred from the photoreceptor belt directly to a print sheet.

An alternative method of generating full color prints is to expose and develop each individual color image on the photoreceptor belt 12 separately, and transfer the single color toner image to an intermediate transfer belt (not shown) before exposing and developing the next color toner image. This is repeated for each color, thereby building up a full color toner image on the intermediate transfer surface. The full color toner image is then transferred from the intermediate transfer surface to the print sheet. The intermediate transfer surface may be formed on an intermediate transfer belt, roll, drum or other suitable structure.

The electrostatographic printing processes described above are well known and are commonly used for light lens and digital reproduction of an original document. In each of the above described methods, four or more sets of discharging 22, exposing, 24 and developing 26 modules are spaced around the photoreceptor belt 12 in order to generate a full color image. The photoreceptor belt must be relatively large in order to accommodate all of the reprographic modules around its periphery. Such a photoreceptor belt may, for example, have a circumference of about 2.8 meters. The ability of the photoreceptor belt 10 to obtain and retain the desired charges degrades over time. As a result, the photoreceptor belt requires regular replacement to maintain optimal performance of the machine. The relatively large photoreceptor belt required for the full color machines described above is cumbersome to handle due to its size and weight.

Referring now to FIGS. 2 and 3, in existing machines the guide rollers 16 and backer bars 18 may be mounted on a photoreceptor sub-frame 40. The sub-frame may include an outboard plate 42 and an inboard plate 44, with the guide rollers and backer bars being mounted for rotation between the plates 42 and 44. The sub-frame may be mounted to the machine frame (not shown) on slides (not shown). With this construction, the sub-frame may be undocked form the machine frame and slid partway out of the machine frame, in order to facilitate access thereto for maintenance, such as photoreceptor belt replacement. Some of the rollers and/or guide plates may be moved into a retracted position (not shown), i.e. radially inward relative to the belt (not shown in FIG. 2), such that the overall peripheral circumference defined by the guide rollers and backer bars is reduced. This provides some slack in the photoreceptor belt 12 during belt installation and removal of the belt, thereby facilitating installation and removal of the belt.

Once installed, the photoreceptor belt 12 is maintained in proper alignment in an optimum position on the guide rollers 16 by a steering mechanism. The steering mechanism typically includes a belt edge sensor 46 for determining the location of the inboard edge 52 of the photoreceptor belt in a known manner. One known type of suitable sensor emits an output voltage that varies depending on the detected location of the inboard edge 52 of the photoreceptor belt. The further inboard the edge of the belt moves, the higher the magnitude of the output voltage emitted by the belt edge sensor becomes.

When the output voltage of the sensor deviates from an acceptable range of voltages, then the steering mechanism steers the belt back toward its optimum position, until the belt edge sensor output voltage is back within the acceptable range. In order to steer the belt 12 in the inboard or outboard direction as required to move the belt back within an acceptable range of the optimum position, one of the rollers, a steering roller 48, is pivoted by a stepper motor 50, or other suitable means (not shown).

When installing a photoreceptor belt 12 in existing machines, the operator must first manually place the inboard edge 52 of the photoreceptor belt 12 over the guide rollers 16 and backer bars 18, as shown in FIG. 3. Care must be taken to clear the edges of the rollers, backer bars and other components on or near the outboard plate 42 of the photoreceptor sub-frame 40, in order to avoid damaging the photoreceptor belt 12. Once these components are cleared, the photoreceptor belt is slid further onto the rollers and backer bars, until the inboard edge 52 of the photoreceptor belt contacts and begins to activate the belt edge sensor 46. The operator now checks the output voltage of the belt edge sensor to determine if the photoreceptor belt is within the effective range of the steering mechanism. The steering mechanism's effective range of operation may be, for example, +/−1 mm of the ideal position for the photoreceptor belt. The operator typically checks to see if the belt is within this range by attaching a volt-meter (not shown) to contacts (not shown) provided for this purpose on the photoreceptor sub-frame 40 or elsewhere on the machine. The operator then checks the volt-meter to see of the belt edge sensor output voltage is within the acceptable range. If not, then the operator must then manually slide the photoreceptor belt in or out slightly, until the belt edge sensor output voltage is within the acceptable range.

The above described installation process entails much physical handling of the photoreceptor belt 12. The Operator must initially place the photoreceptor belt on the photoreceptor sub-frame 40 without catching the edge or surface of the belt on any part of the photoreceptor sub-frame, which would result in damaging dings and/or scratches in the photoreceptor belt. When installing a relatively large photoreceptor belt, it is difficult to perform this feat without damaging the photoreceptor. Next, the operator must slide the photoreceptor belt into contact with the belt edge sensor 46. In order to slide the belt into place on the photoreceptor sub-frame, the operator must place her hands on the photoconductive surface 14 of the belt and push inward on the belt. Physical contact with the photoconductive surface of the belt degrades this critical surface and must be minimized. Once in this rough position, the operator must push and pull on the belt, again by contacting the photoconductive surface of the belt, until the output voltage of the belt edge sensor is within the acceptable range. During this process, should the belt be accidentally slid too far inward against the belt edge sensor or other components of the photoreceptor sub-frame, then the inboard edge of the belt may be damaged.

Since the photoconductive surface 14 of the belt 12 is sensitive to light, it must be installed on the photoreceptor module relatively quickly, in order to minimize exposure of the belt to light. Prolonged exposure of the photoreceptor belt to the light overly discharges or "light shocks" the photoconductive material and shortens the useful life of the belt. As result, when installing a photoconductive belt 12 as described above, the operator is necessarily in a hurry to avoid harmful prolonged exposure the photoconductive belt to the light. The combination of being in a hurry and having to accurately locate the inboard edge of the photoreceptor belt up against an edge sensor within a 2 millimeter range creates an unacceptably high likelihood of accidentally "dinging" or scratching of the photoconductive surface 14 of the belt 12.

There is a need in the art for an improved method and apparatus for installing a photoreceptor belt 12 in an electrostatographic printing machine. There is need for such an improved method and apparatus that minimizes the handling of the belt by the operator, so that the chances of accidentally damaging the belt due harmful contact with the photoconductive surface of the belt are minimized. There is also a need in the art for a faster method and apparatus for installing a photoreceptor belt in a machine, such that exposure to light and handling of the belt can both be minimized.

BRIEF DESCRIPTION OF THE DRAWINGS

The invention will now be described, by way of example, with reference to the following drawings, of which.

Like reference numerals have been used throughout the drawings to identify identical or similar elements.

DESCRIPTION OF AN EMBODIMENT OF THE INVENTION

Figure 4:
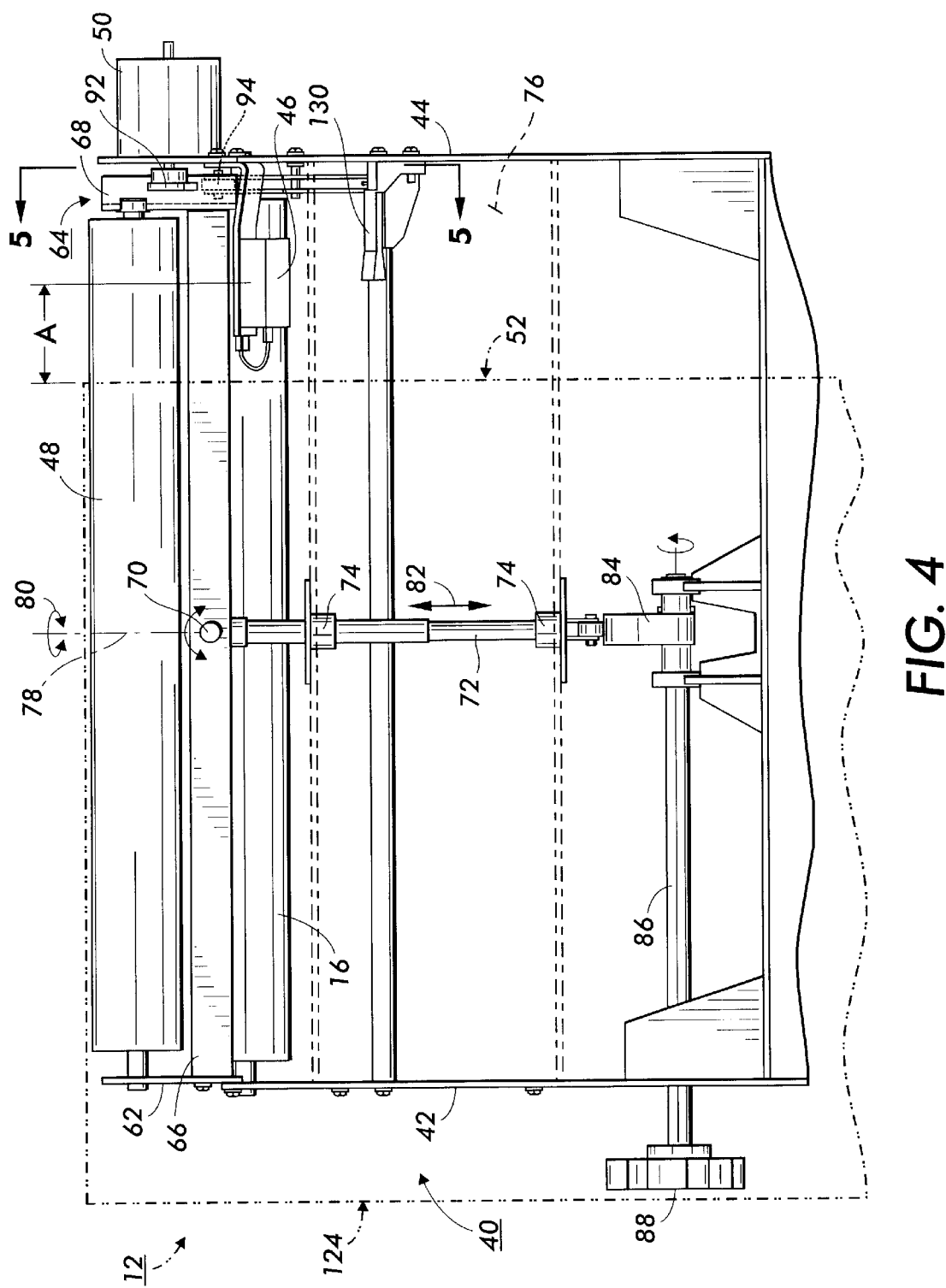
FIG. 4 is a side view of the top portion of a photoreceptor module incorporating a steering mechanism, by way of example, suitable for practicing the present invention.

Referring now to FIG. 4 one form of a photoreceptor sub-frame incorporating a steering mechanism suitable for practicing the present invention will now be described by way of example. A steering roller 48 is mounted for rotation between a pair of end plates or brackets 62, 64 mounted on opposing ends of a cross bar 66. The inboard end bracket 64 has a steering flange 68 extending inboard therefrom. The cross-bar 66 may be pivotally mounted on a pin 70 located on the top of a post 72. The post is journalled for rotation in a pair bearings 74 mounted to a mounting plate 76 (shown in ghost in FIG. 4) secured to the photoreceptor sub-frame 40. With this construction, the steering roller 48 may pivot in a horizontal plane about the axis 78 of the post 72 as shown by arrow 80 in FIG. 4, in order to steer the belt 12 in the inboard and outboard directions upon the guide rollers 16.

The post 72 may also be mounted for vertical movement in the bearings 74 as indicated by arrow 82. In which case, the lower end of the post rests on top of a belt release and locking cam 84 mounted on an actuating rod 86. A knurled knob 88 is provided on the outboard end of the actuating rod. By rotating the knob 88, the belt release cam may be selectively rotated for raising and lowering the post 72 between a raised belt locked position (shown in FIG. 4) and a lowered belt release position (not shown), as indicated by arrow 72. When in the raised belt locking position shown in FIG. 4, the steering roller 48 presses against the inside of the photoreceptor belt 12 for maintaining the belt in a taught, such that the belt is held tightly on the guide rollers 16 and backer bars 18. When in the lowered belt release position (not shown), the steering roller is moved inward providing slack in the photoreceptor belt 12, such that the belt is loosened for facilitating installation and removal of the belt from the sub-frame 40. When in the lowered belt release position, the steering roller is free to pivot about the pin 70, due to the loosened state of the photoreceptor belt. With this construction, additional slack may be provided at the outboard end of the sub-frame 40, in order to facilitate installation and removal of the inboard edge 52 of the photoreceptor belt over the rollers and backer bars.

A stepper motor 50 is mounted to the rear plate 44 adjacent to the steering flange 68. A steering cam 92 is attached to the output shaft of the stepper motor 50 and engages a first side of the steering flange 68. An idler roller 94 is mounted to a pivot arm 96. The pivot arm is pivotally attached to the inboard plate 44 (not visible in FIGS. 5 and 6) on an axle 98. One end of a tension spring 100 is secured to the inboard plate 44 and the other end of the spring is attached to the pivot arm 96. The spring is mounted under tension, such that the spring biases the pivot arm about the axle 98 and presses the idler roller 94 against a second side of the steering flange 68 as indicated by arrow 102 in FIG. 5. Thus, the idler roller presses the steering flange 68 against the steering cam 92, thereby ensuring substantially continuous contact of the steering flange with the steering cam.

Figure 5:
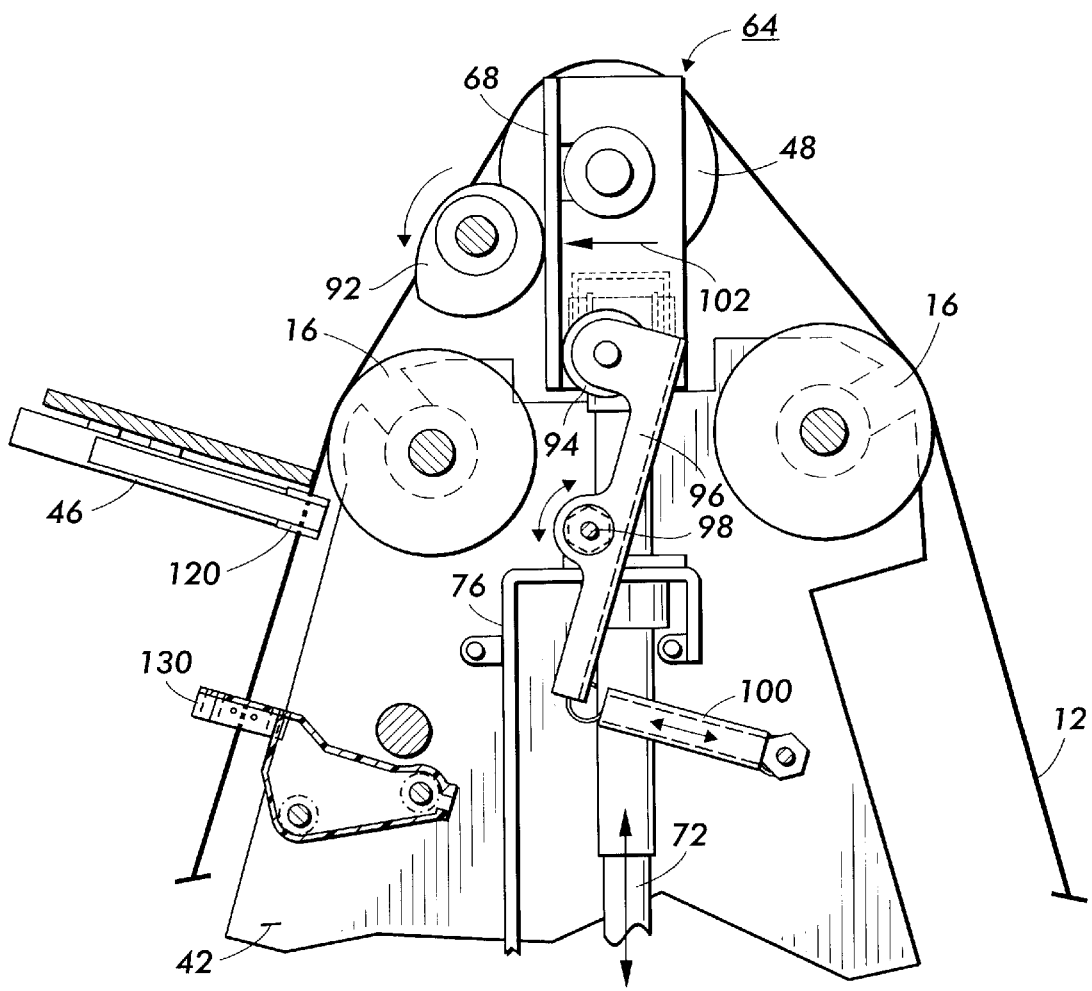
FIGS. 5 and 6 are rear end views of the steering mechanism of FIG. 4.
Figure 6:
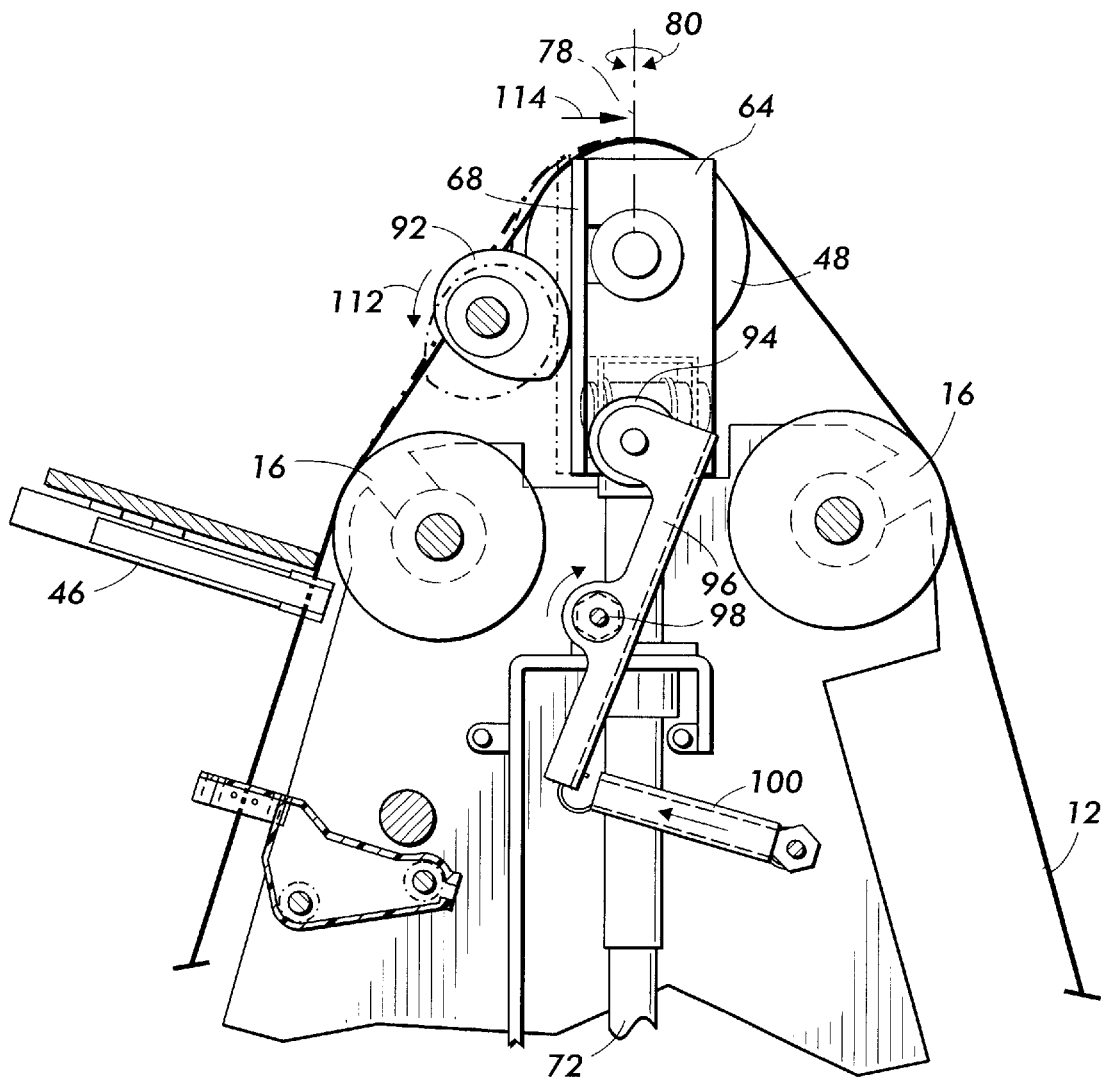

The steering roller 48 is pivoted about the axis 78 of the post by rotating the steering cam 92 with the stepper motor 50 (not visible in FIGS. 5 and 6). When the stepper motor rotates the steering cam 92, the steering flange 68 follows the cam surface of the steering cam to the right or left in FIGS. 6 and 7. Thus, the steering roller 48 is pivoted about the axis 78 of the post 72, as indicated by arrow 80, for steering the photoreceptor belt 12. The steering cam 92 is shown in a neutral position in FIG. 5. When the steering cam is in the neutral position, the steering roller is perpendicular to the inboard and outboard end plates and parallel to the other guide rollers 16, such that the belt 12 is steered substantially straight on the guide rollers and maintains its current position. When the steering cam is rotated counterclockwise as indicted by arrow 112 in FIG. 6, the steering flange 68 moves to the right under the influence of the cam as shown by arrow 114 in FIG. 6. Motion of the steering flange 68 to the right causes the steering roller 48 to pivot about the axis of the post as indicated by arrow 80 in FIG. 6. When pivoted to the position shown in FIG. 6, the steering roller steers the photoreceptor belt 12 in the inboard direction upon the guide rollers 16. When it is desired to steer the photoreceptor belt in the outboard direction, the steering cam is rotated clockwise, as viewed in FIGS. 5 and 6, from the neutral position, such that the steering flange 68 moves to the left (not shown), as viewed in FIGS. 5 and 6. As a result, the steering roller is pivoted in the opposite direction for steering the belt in the outboard direction on the guide rollers.

A belt edge sensor 46 is attached to the inboard end plate 44 of the sub-frame 40. The belt edge sensor has a spring biased pivotal contact arm 120. The contact arm is spring biased into an outermost inactivated position and is pivoted or deflected into its activated position by contact with the photoreceptor belt 12. When the contact arm is deflected, it provides a variable output voltage that varies in accordance with the degree of deflection of the contact arm. For example, the output voltage may increase 1 volt for each 1 millimeter of deflection of the contact arm. When the contact arm is in the inactivated position, the belt edge sensor 46 outputs a first voltage of, for example, about 0.25 volts. The contact arm may be deflected to an innermost fully activated position, at which point the belt edge sensor outputs a voltage of, for example, 3.5 volts. The overall distance of travel of the contact arm from the inactivated position may be, for example 4 millimeters. The acceptable operational range of the photoreceptor belt 12 my be a range of, for example 2 millimeters, that is located within the overall travel distance of travel of the contact arm. The output voltage in the normal operational steering range is, for example, from about 1.5 volts to about 3.5 volts, with the optimum position of the belt being indicate by 2.5 volts.

It will be appreciated that other types of well known sensors, for example, an optical or proximity sensor may be alternatively employed. It will also be appreciated that the output voltages set forth above are by way of example. The output signal will of course vary from one type of sensor to another.

The various machine operations are regulated by a controller (not shown) that is preferably a programmable microprocessor capable of managing all of the machine functions and subsystems. Programming conventional or general purpose microprocessors to execute imaging, printing, document, and sheet handling control functions with software instructions and logic is well known and commonplace in the art. Such programming or software will, of course, vary, depending on the particular machine configuration, functions, software type, and microprocessor or other computer system utilized. Those of skill in the software and/or computer arts can readily program the microprocessor and/ or otherwise generate the necessary programming from functional descriptions, such as those provided herein, or from general knowledge of conventional functions together with general knowledge in the software and computer arts, without undue experimentation. The operation of the systems described by way of example herein may be accomplished by conventional user interface control inputs selected by the operator from the printing machine consoles. Conventional sensors or switches may be utilized to keep track of the position of documents, print sheets and photoreceptor belt.

Figure 3:
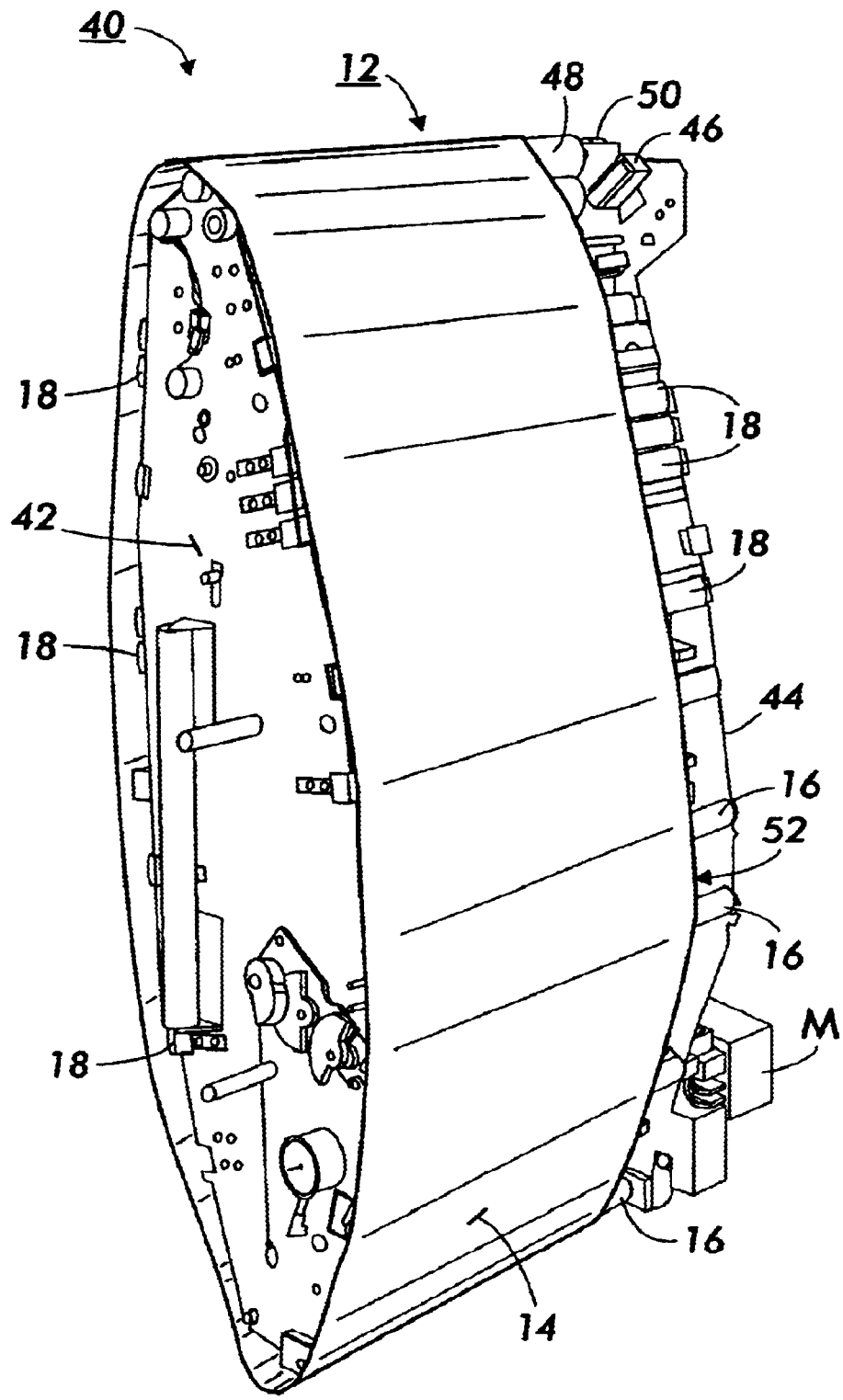
FIG. 3 is a perspective view of the photoreceptor module of FIG. 2, showing a photoreceptor belt placed partially on the photoreceptor module.

A process of installing the photoreceptor belt 12 according to one form of the present invention will now be described. As in the prior art, the operator must first place the inboard edge 52 of the photoreceptor belt 12 over the belt guide rollers 16 and backer bars 18, as shown in FIG. 3 and in ghost in FIG. 4. Once these components are cleared, the photoreceptor belt is slid further onto the guide rollers, until the outboard edge 124 of the photoconductor belt is approximately flush with the outboard plate 42 of the photoreceptor module sub-frame 40. This position provides a positive visual and tactile reference point that is easily and quickly located by the operator. It is not necessary for the operator to slide the photoreceptor belt all the way into contact with and slightly deflect the belt edge sensor 46, as is required by existing machines. At this point, the machine covers (not shown) may be closed to avoid over exposure and resultant light shocking of the photoreceptor belt 12.

Figure 1:
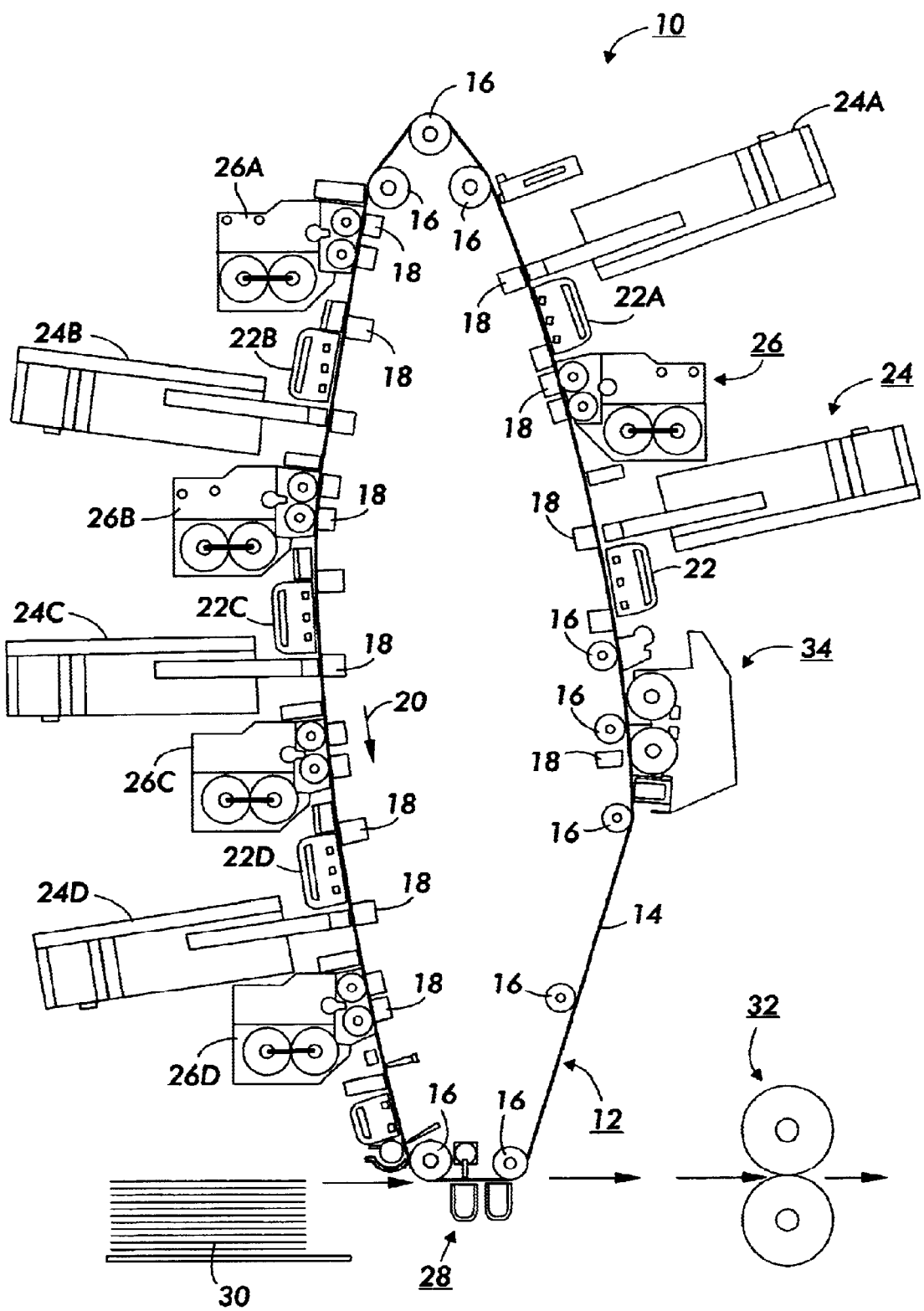
FIG. 1 is a diagrammatic illustration of an exemplary reprographic printing machine.
Figure 2:
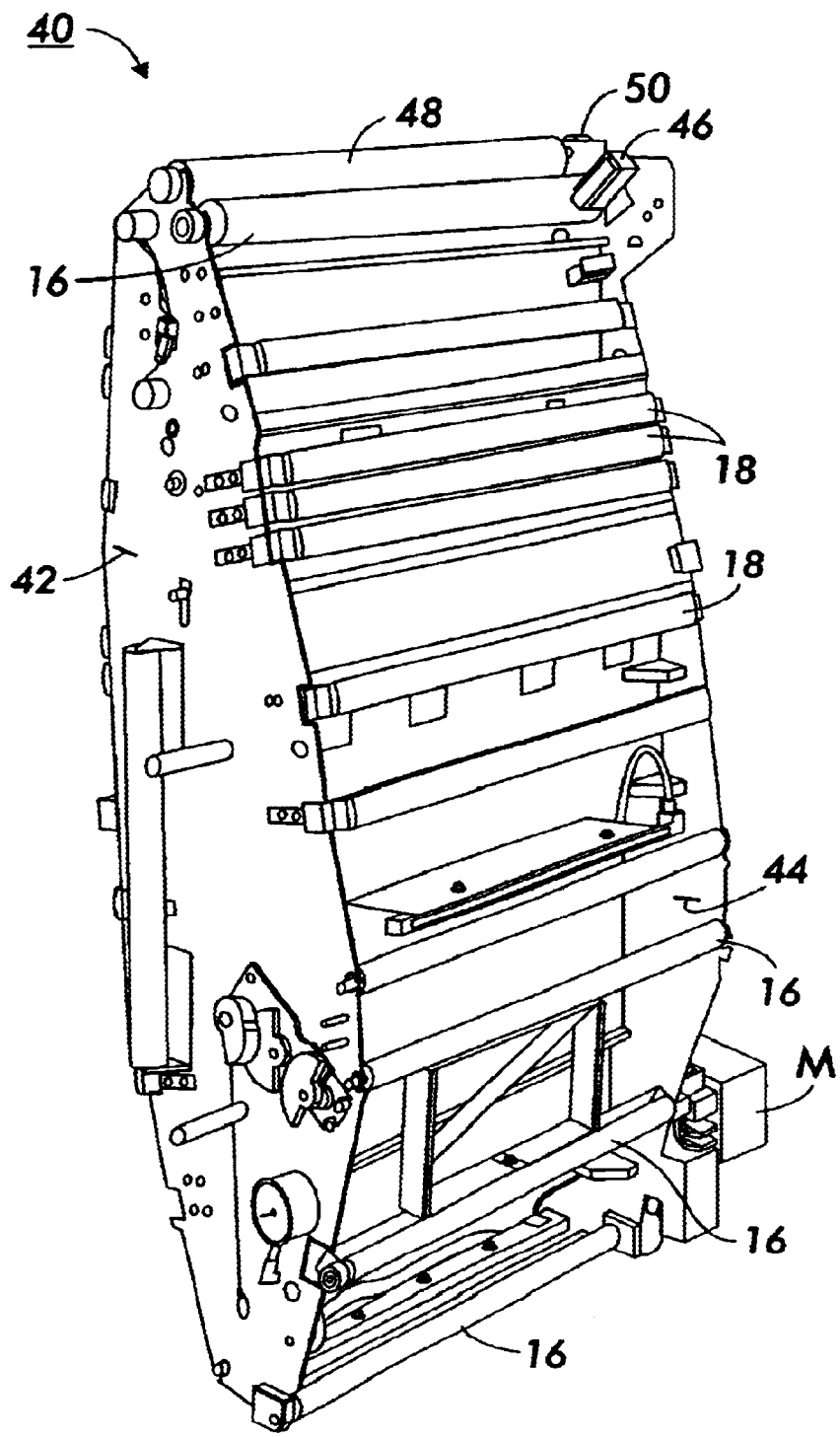
FIG. 2 is a perspective view of a photoreceptor module with the photoreceptor belt removed therefrom.
Figure 7:
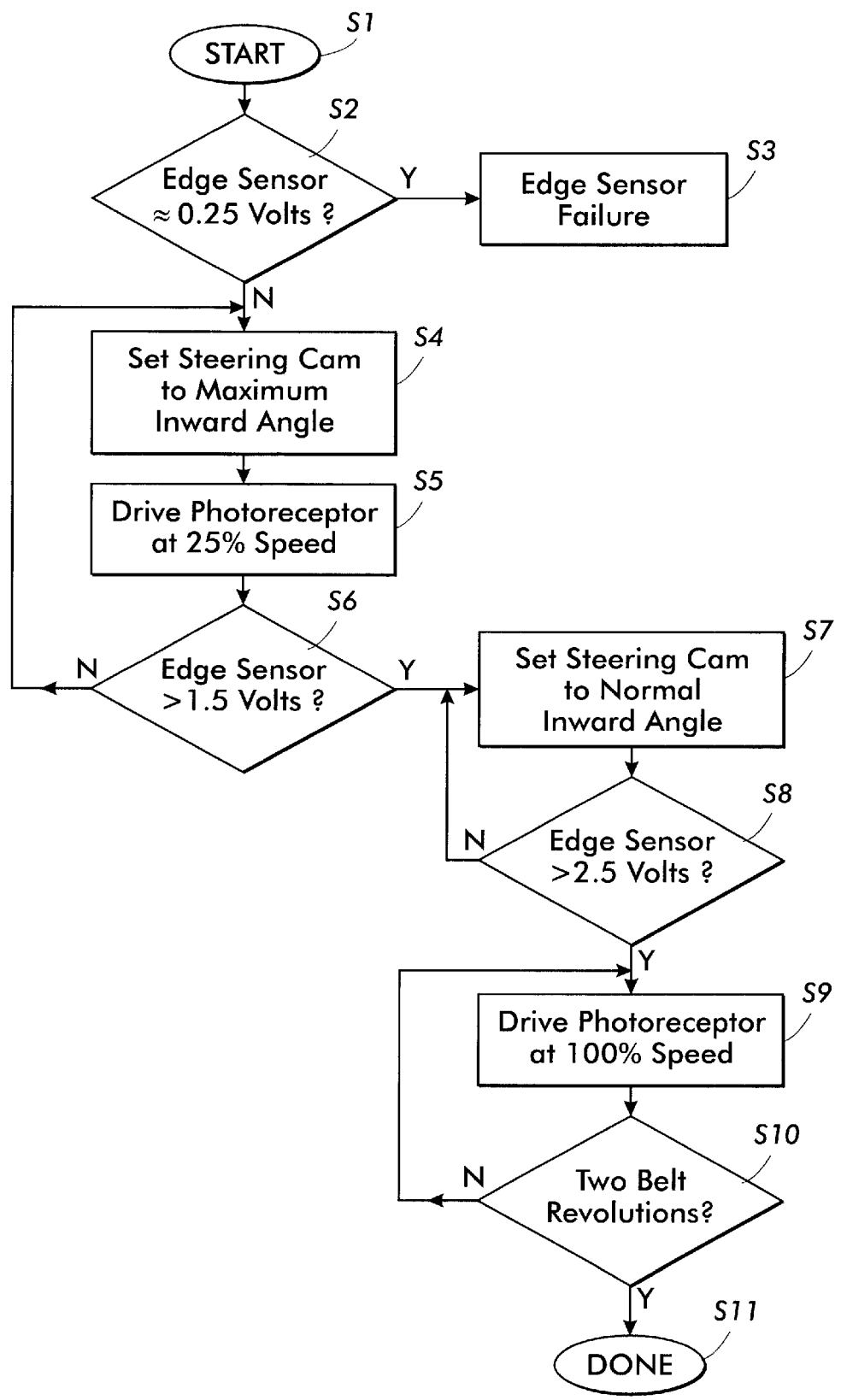
FIG. 7 is a flow chart showing an automated portion of a belt installation process according to the present invention.
Figure 8:
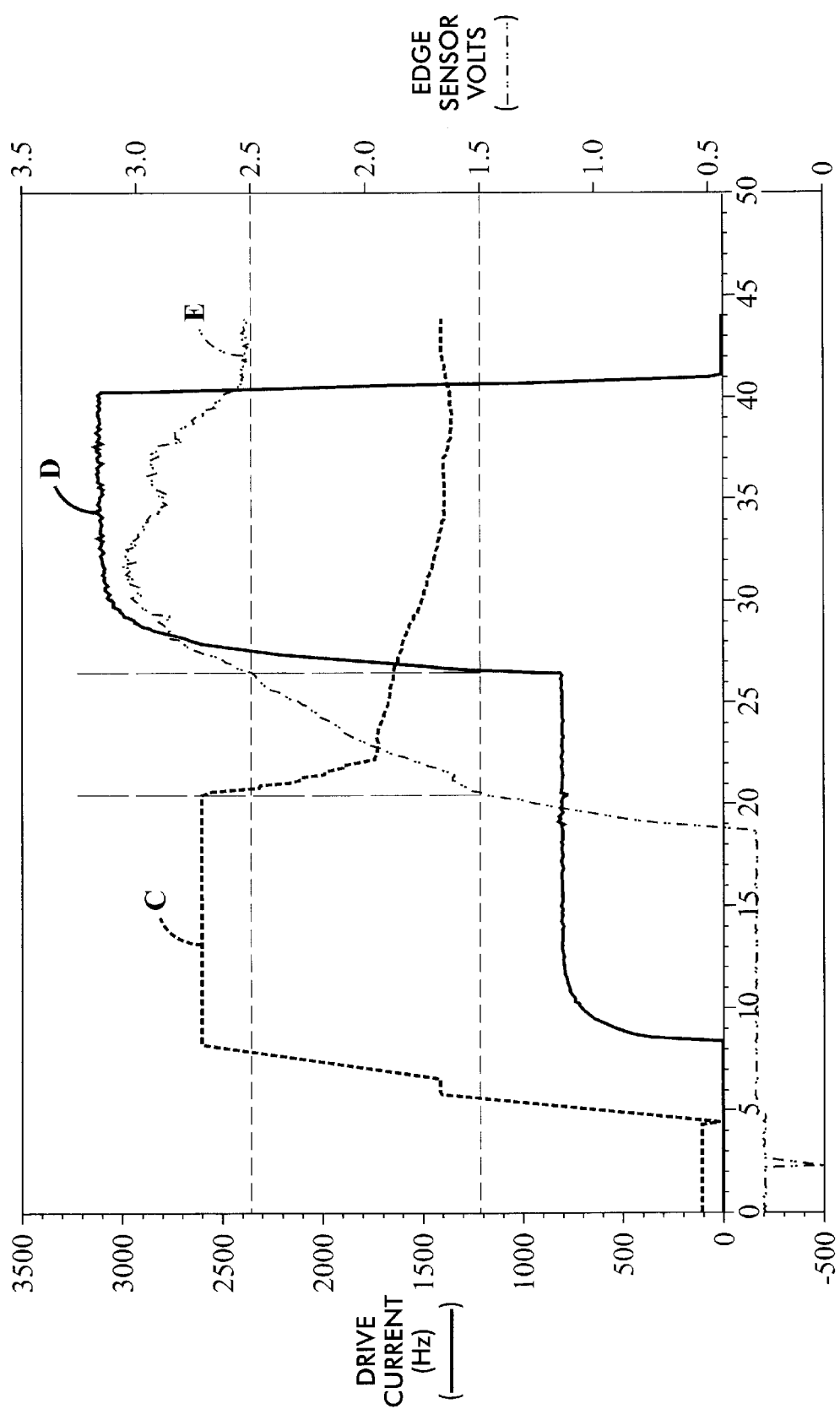
FIG. 8 is a graph of the automated portion of a belt installation process according to the present invention.

With reference now to FIGS. 7 and 8, one form of the automated portion of the present inventive process will now be described. FIG. 7 is a flow chart of the process and FIG. 8 is a graph showing the steering cam angle (line C), the motor drive current frequency (line D) and the belt edge sensor output voltage (line E). The steering cam angle C is a measure of the degree of rotation of the steering cam from its neutral position. The drive current frequency is the frequency of the current being used to drive a motor M (FIG. 2) that drives the photoreceptor belt 12 via one of the guide rollers 16. The higher the drive current frequency the faster the motor drives the photoreceptor belt.

Once the photoreceptor belt has been placed in rough position on the guide rollers as described above, the operator initiates the automated belt alignment process via the user interface, or other switch or button provided on the machine for this purpose in step S1. Upon initiation of the alignment process, the controller first checks to determine whether the belt edge sensor output voltage E is at its lowest inactivated level, for example, approximately 0.25 volts in step S2. If the belt edge sensor output voltage E is not at the inactivated level, then the controller determines that the belt edge sensor has malfunctioned in step S3. If the belt edge sensor output voltage is at the inactivated level, then the controller adjusts the stepper motor 50 to place the steering cam 92 at a maximum inward steering angle C (as shown in FIG. 6) in step S4. This places the steering roller at an initial inward steering angle. The controller next drives the photoreceptor belt at an initial or preliminary alignment speed D that is less than the normal operational speed, for example 25% of the operational speed. This may be performed by driving the drive motor M with a drive current of, for example, 800 Hertz, in step S5, which is lower then the normal operational drive current, which may be, for example, at a drive current of 3000 Hertz. This causes the photoreceptor belt to track inward toward the belt edge sensor. This condition continues until the contact arm 120 of the belt edge sensor 46 is deflected by the inboard edge 52 of the photoreceptor belt 12 and the belt edge sensor output voltage E is greater than about, for example, 1.5 V, step S6. This indicates that the photoreceptor belt is approaching the normal operational steering range of steering mechanism.

When the controller receives an output voltage E that is equal to or greater than 1.5 volts from the belt edge sensor, then the controller adjusts the angle of the stepper motor to decrease the steering angle C of the steering cam in step S7. The cam steering angle C is decreased to an angle of degrees, which is within the normal operational range of steering cam angles. This places the steering roller at an operational inward steering angle. The photoreceptor belt will continue to be steered inward, but at the slower normal operational angle of travel. This condition continues until the controller receives an output voltage E that is greater than 2.5 volts from the belt edge sensor in step S8. An output voltage greater than 2.5 volts indicates that the photoreceptor belt has reached its optimum position on the steering roller.

When the controller receives an output voltage E that is greater than 2.5 volts from the belt edge sensor, the controller drives the photoreceptor belt at the normal operational speed, 100% speed in step S9, and steers the belt via the steering roller under the normal operational inward and outward steering angles. The controller now monitors a belt revolution sensor 130 and counts two belt revolutions in step S10. The belt revolution sensor may be an optical sensor that detects a small hole or transparent window in the inboard edge 52 of the photoreceptor belt 12. Finally in step S11 the belt drive is shutdown and the initial belt alignment routine is closed.

The controller waits two revolutions of the photoreceptor belt 12 at operational speed after the photoreceptor belt has reached its optimum location at the belt edge sensor, because the belt tends to become tilted or skewed on the photoreceptor module when it is being steered. When the steering roller is tilted, the top of the belt begins to track inward. Since the rest of the guide rollers remain perpendicular to the belt, the bottom of the belt does immediately begin to track when the steering roller is pivoted. The bottom of the belt remains stationary until the motion of the top of the belt translates down the length of the belt. The top of the belt is effectively pulls the bottom of the belt over, as the top is steered by the steering roller. After two full revolutions of the photoreceptor belt, the bottom of the photoreceptor belt will have substantially followed the top of the belt into its current position. It will be appreciated that, depending on the size of the belt, the elasticity of the belt, the degree of friction between the belt and the guide rollers, and many other factors, more or less than 2 revolutions of the belt may be required for the belt to straighten out on the photoreceptor module.

The speed of the photoconductive belt 12 has been described by way of example above using the frequency of the drive current of the drive motor. It will be appreciated that the speed of the belt upon the rollers is what is ultimately being controlled. The operational speed of the belt will vary from one machine to another and is easily determined by one of ordinary skill in the art. Similarly, the steering angles of the steering roller will vary from machine to machine. Suitable steering angles are well understood and are easily determined by one of ordinary skill in the art.

While the present invention has been described in connection with an illustrative embodiment, it will be understood that the preceding description is not intended to limit the invention to the specifics of the disclosed embodiment. On the contrary, the description is intended to cover all alternatives, modifications, and equivalents that may be included within the spirit and scope of the invention as defined by the appended claims. Other aspects, features and embodiments of the present invention will become apparent to one of skill in the art upon reviewing the preceding description and the accompanying drawings. For example, the invention has been described by way of example as being employed to install a photoreceptor belt in a reprographic printing machine. It will be appreciated, however, that the method and device is equally suited for installing other types of imaging belts in a printing machine. For example, the belt may be an intermediate transfer belt or a non-photoconductive imaging member in a solid or liquid ink printing machine.

What is claimed is:

1. A method for mounting and aligning an endless belt having an optimum position within an acceptable range on associated guide rollers in a machine, comprising:

a) manually placing said belt over an outboard end of said guide rollers and sliding said belt inward over said guide rollers to a first rough position located to an outboard side of said acceptable range of positions;

b) steering said belt inward at an initial steering angle while driving said belt on said rollers at an initial speed;

c) determining when said belt has reached said acceptable range of positions;

d) when it is determined that said belt has reached said acceptable range of positions, steering said belt inward using an operational steering angle having a magnitude that is less than a magnitude of said initial steering angle; and e) when it is determined that said belt has reached said optimum position, driving said belt at an operational speed that is greater than said initial speed and steering said belt inward and outward at operational magnitude angles to maintain said belt in said optimum position.

2. A method according to claim 1, further comprising, ceasing operation, after driving said belt at said operational speed for two revolutions in step e.

3. A method according to claim 1, wherein said machine is an electrostatographic printing machine and said belt is a photoconductive belt.

4. An imaging belt steering device for a reprographic printing machine, comprising:

a frame;

a plurality of parallel guide rollers mounted for rotation on said frame, said guide rollers having outboard ends and inboard ends;

a steering roller mounted for rotation on said frame, said steering roller being pivotally mounted about a steering axis extending generally perpendicular to said steering roller's axis of rotation, providing pivotal motion of said steering roller about a neutral position parallel to said guide rollers;

a drive motor operatively connected to a driven one of said guide rollers for driving said driven guide roller;

a steering device operatively contacting said steering roller for selectively pivoting said steering roller about said steering axis;

a belt edge sensor mounted to said frame near said inboard ends of said guide rollers for contacting an inboard edge of a photoreceptor belt that has been installed on said rollers, detecting a position of said installed belt on said rollers, and emitting a belt position signal indicative of the position of said installed belt;

a controller connected to said belt edge sensor, to said drive motor and to said steering device for controlling said drive motor and said steering device in response to said belt position signal;

wherein, when a belt is installed on said rollers in a position that is outboard of said belt edge sensor, said belt edge sensor emits an initial belt position signal indicating that the belt is not within range of said belt edge sensor;

upon receiving said initial belt position signal said controller activates said steering device and pivots said steering roller to an initial inward steering angle and activates said motor to drive said installed belt at an initial speed, whereby said belt tracks inward on said rollers;

upon receiving a signal from said edge belt sensor indicating that said installed belt is within an acceptable range of positions, said controller activates said steering device to place said steering roller at an operational inward steering angle having a magnitude that is less than a magnitude of said initial inward steering angle;

upon a signal from said edge belt sensor indicating that said installed belt has reached an optimum position, said controller activates said motor to drive said installed belt at an operational speed that is greater than said initial speed.

5. A method for aligning an endless belt having an optimum position within an acceptable range on associate guide rollers in a machine, comprising:

a) manually placing said belt over an outboard end of said guide rollers and sliding said belt inward over said guide rollers to a first rough position;

b) determining when said belt has reached said acceptable range of positions;

c) when it is determined that said belt has reached said acceptable range of positions, steering said belt inward using a given operational steering angle; and d) when it is determined that said belt has reached said optimum position, driving said belt at an operational speed and steering said belt inward and outward to maintain said belt in said optimum position.

6. A method according to claim 5 including the step of steering said belt at an initial steering angle after the step of manually placing said belt.

7. A method according to claim 5, further comprising, ceasing operation, after driving said belt at said operation speed for two revolutions in step d.

8. A method according to claim 5, wherein said machine is an electrostatographic printing machine and said belt is a photoconductive belt.

9. A method for mounting and aligning an endless belt having an optimum position within an acceptable range on associated guide rollers in a machine, comprising:

a) manually placing said belt over said guide rollers to a first rough position;

b) steering said belt while driving said belt on said rollers at an initial speed;

c) determining when said belt has reached said acceptable range of positions;

d) when it is determined that said belt has reached said acceptable range of positions, steering said belt inward; and e) when it is determined that said belt has reached said optimum position, driving said belt to maintain said belt in said optimum position.

10. A method according to claim 9, further comprising, ceasing operation, after driving said belt in step e.

11. A method according to claim 9, wherein said machine is an electrostatographic printing machine and said belt is a photoconductive belt.

\* \* \* \* \*